United States Patent
Beck

[11] 3,898,649
[45] Aug. 5, 1975

[54] ENCODER DEVICE FOR USE WITH POLYDECADE CONSUMPTION OR USAGE METERS

[75] Inventor: Donald C. Beck, Parsippany, N.J.

[73] Assignee: Automated Technology Corporation, Hackensack, N.J.

[22] Filed: Jan. 18, 1974

[21] Appl. No.: 434,422

[52] U.S. Cl. .................. 340/347 P; 340/347 AD
[51] Int. Cl. ................... G08c 9/00; H03k 13/00
[58] Field of Search .............................. 340/347 P

[56] References Cited
UNITED STATES PATENTS

| | | | |
|---|---|---|---|
| 3,142,835 | 7/1964 | Larky | 340/347 |
| 3,262,108 | 7/1966 | Schuman | 340/347 |
| 3,376,567 | 4/1968 | Brothman et al. | 340/188 |
| 3,560,961 | 2/1971 | Mueller | 340/347 |

Primary Examiner—Malcolm A. Morrison
Assistant Examiner—Vincent J. Sunderdick
Attorney, Agent, or Firm—Sommers & Sommers

[57] ABSTRACT

The encoding wheels associated with successive decades of a polydecade meter are divided into sectors. The rotational positions of each of the said encoding wheels are determined by conventional reading means, which may for example, optically examine tracks of coding that are present around the periphery of a wheel. The sectors are read out in a cyclic Gray code, which is then converted for each decade to a decimal number corresponding to the sector. Ambiguity correction is effected by examining the higher decade in the case of any pair of adjacent decades, and using its value to establish a possible range of the lower decade wheel. The higher decade is defined as the slower moving wheel. The lower decade wheel is then examined to determine whether it falls in the determined range, and thereupon the read value of the coarse wheel (higher decade) is adjusted by plus or minus 1, or allowed to stand, in accordance with the measured lower decade or fine wheel value relative to the cited range. Means are further present, for evaluating the total number of accumulated sectors that have passed a reference point in the case of the lower decade or least significant digit (LSD) wheel, and for then scaling the sectors determined to be cumulatively present on each wheel to decimal values. For purposes of clarity the higher decade is also referred to as the coarse or slower moving wheel, while the lower decade is also called the fine, faster or least significant digit (LSD) wheel.

7 Claims, 2 Drawing Figures

ENCODER DEVICE FOR USE WITH POLYDECADE CONSUMPTION OR USAGE METERS

BACKGROUND OF THE INVENTION

This invention relates generally to encoding devices, and more specifically relates to apparatus for converting the analog value of a rotatable shaft to corresponding digital information for transmission to a utilization point.

Electric, gas, water, or similar meters are typically characterized by a plurality of rotatable shafts, which are so inter-related that successive shafts are angularly displaced on a 10:1 basis or other ratio with respect to its neighbor, whereby a direct decimal readout of the meter is enabled, by means of indicator hands which rotate with the several shafts about dials on a face plate. In a typical power utility installation for example, periodic reading of the meter is conducted by an individual who inspects the readings at each of the plurality of dials associated with the several shafts, and thereby may record a direct decimal value.

Within recent years a considerable amount of interest has been evidenced in the concept of automating the readout function of the "polydecade" meters, as described above. Among the reasons that may be cited for such interest is a desire to reduce the cost of manual servicing, and the fact that the meters sought to be read are often in relatively inaccessible places in homes, and at factories and other industrial installations. Moreover interest has centered in providing an automated readout in such a form that the said readout may be directly transmitted as, for example, by conventional transmission lines to the utility company or other provider of the services recorded on the meter.

In order to achieve the results indicated, numerous constructions have been provided, which digitally encode signals from the said meters in accordance with the decimal readings present thereat. A principal problem, however, with the bulk of proposed prior art systems has been that errors in the automated readouts can occur in several ways, each of which may introduce intolerable results into the digitally transmitted information. In this connection it may firstly be noted that one source of such error lies in the binary code itself, where a change from one decimal number to a successive number may be represented by change at several of the corresponding binary digits. This introduces the possibility of multiple points at which error can be made in the conversion process. In order to eliminate this possibility it has become common to utilize in analog-to-digital conversion equipment, the so-called "Gray code" or reflected binary system. The advantage of the cited Gray code system is that successive integers differ from one another by only one digit. Under some circumstances, however, as will become further apparent hereinbelow, a simple reflected binary system yet permits ambiguities in that when the binary 0 is represented by the absence of a signal, it is not desirable to have a decimal symbol 0 represented by binary 0000 since it cannot be distinguished from a no-signal condition.

In the type of meters to which the present invention appertains, a further and highly significant source of error may occur as a given decade approaches a whole number. For example, in a typical watt-hour meter we may consider the ambiguity that may arise upon the dial pointer hand for the thousands reading approaching a whole number. As this happens it will be evident that the adjacent hundreds dial pointer approaches simultaneously 0. Suppose the thousand's pointer thus reaches the whole number 6 as the hundred's pointer is between the digits 9, and 0. It will be evident that a manual observer reading the said dial plate would properly read the number as 5900. On the other hand, a straight digital readout from the adjacent dials could erroneously indicate a reading of 6900 — a relatively enormous error. Basically, it will be evident that the manual decision process involved in obtaining a correct reading involves inspecting the lower decade in an ambiguous situation, and making a decision from the reading at the lower decade as to what value should properly be assigned to the adjacent higher decade. In other words, in the example cited, the observer having decided that the hundred's pointer is between 900 and 1000, then assigns a value of 5000 to the adjacent thousand's-decade pointer.

The possible sources of error as above described, can accordingly introduce intolerable results into a digitally encoded readout. In the past, in order to eliminate the several possibilities cited, relatively complex and bulky electronic and/or optical means have been proposed for use in conversion devices of the present type. Not only, however, have such proposed constructions tended to introduce inordinate and unacceptable costs into said equipment, but moreover the consequent bulk of the proposed constructions have been such as to not be readily applicable to the compact meters that are commonly employed in utility and similar measuring applications: for example, the manually read wheels associated with a typical power utility meter, may be the order of one-half inch in diameter. In this type of compact environment the use (as sometimes proposed) of numerous auxiliary tracks to remove ambiguities of the type mentioned in the foregoing paragraphs becomes highly impractical.

In copending application, Ser. No. 314,391, filed Dec. 12, 1972, now U.S. Pat. No. 3,846,788 for "POLYDECADE DECIMAL TO DIGITAL ENCODER", which application is assigned to the assignee of the instant application, we disclose encoder apparatus which eliminates many of the foregoing problems. In accordance with that disclosure, a system is set forth utilizing a plurality of point light sources and paired, point photo-sensors, together with a plurality of encoder wheels, one of which is associated with each successive decade shaft of the meter. Concentric light transmitting tracks are present on each of the said encoding wheels, which tracks cooperate with the light source-sensor pairs, to provide outputs at the sensors in accordance with the angular position of the shaft and encoder wheels. Associated logic circuitry acts to effect the reading decision where a borderline value is present at the least significant digit being read on the meter. Upon this least significant digit reading being determined, the said logic directs selection of the sensors utilized for reading successively higher decades in accordance with the decision rendered at the LSD reading. While that system is therefore highly effective, for the purposes set forth, it yet remains relatively complex in utilizing a relatively large number of diodes or other sensors, and a fairly complex logic scheme in order to resolve the ambiguities.

SUMMARY OF INVENTION

In accordance with the principles of the present invention, the encoding wheel associated with each decade of a polydecade meter, is divided into sectors, which in general are of number S, successive code wheels being coupled through a gear train with a reduction in ratio of $n$. The specific number S of sectors determines the number of bits of coding for a binary system, i.e., the minimum number of bits equals the integer value of the quantity $\log_2 S$. Accordingly, if 16 sectors are utilized as will representatively be the case, 4 bits are required; where 10 sectors are utilized, 4 bits are required; with eight sectors, 3 bits are utilized, etc. The rotational positions of each of the said encoding wheels are determined by conventional machine-reading techniques as, for example, by optically examining the four tracks of coding that may representatively be present where 16 sectors are present around the periphery of a code wheel. The sectors are read out in a cyclic Gray code, which is then converted for each decade to a decimal number, corresponding to the specific sector, as for example, 0 through 15 where 16 sectors are present. Ambiguity correction of the successive higher decades is then effected by examining the higher decade in the case of any pair of adjacent decades, using its value to establish the possible range of the lower (i.e. "fine" wheel); thereupon examining the fine (lower decade) wheel to determine whether it falls in the said range, and thereupon adjusting by plus or −1 the read value of the corresponding coarse wheel (or allowing the measured value to stand) in accordance with the measured fine wheel value relative to the said range. Ambuiguity correction is thereby effected, by repeating this technique is serial fashion for the successively higher decades. Means are present for further evaluating the total number of accumulated sectors that have passed a reference point in the case of LSD (least significant digit) wheel, and for then scaling the sectors determined to be cumulatively present on each wheel, to decimal values.

BRIEF DESCRIPTION OF DRAWINGS

The invention is diagrammatically illustrated, by way of example, in the drawings appended hereto in which.

DESCRIPTION OF PREFERRED EMBODIMENT

Figure 1:
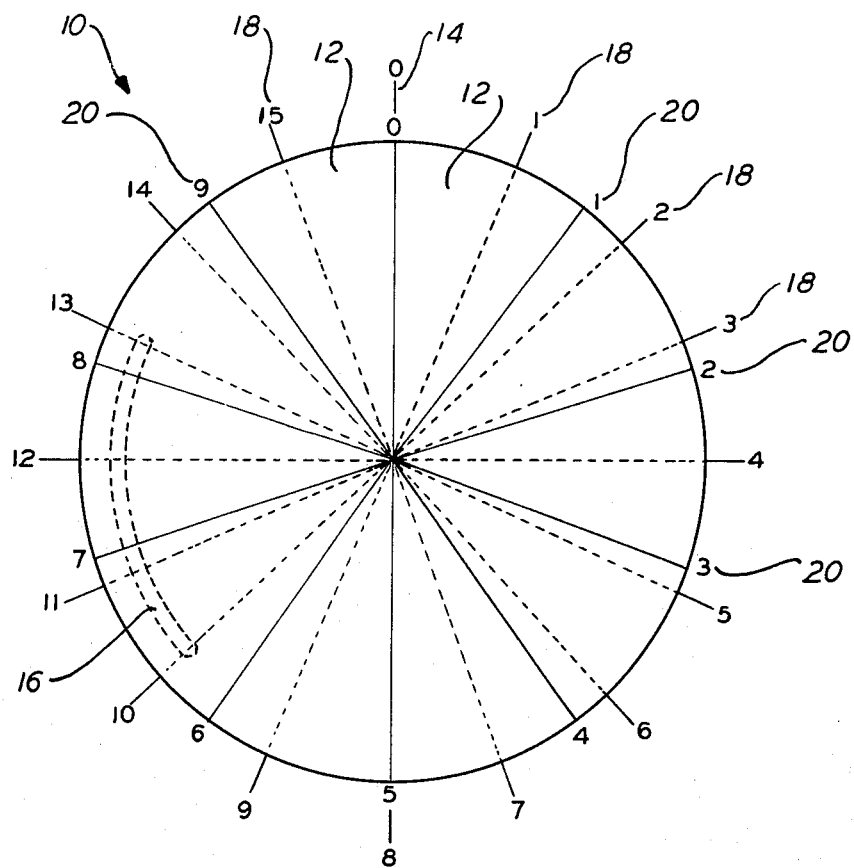
FIG. 1 is a schematic plan view of an encoding wheel of the type utilized in the present invention.

In accordance with a preferred embodiment of the present invention, it may be assumed for purposes of concrete illustration, that each encoding wheel associated with a given decade of a polydecade meter is provided with 16 pie-shaped sectors, extending about the face of the encoding wheel. An encoding wheel 10 of this type is shown in FIG. 1, the wheel being utilizable for example, in apparatus such as that set forth in our copending application, Ser. No. 314,391, previously referred to. As is further illustrated in the said applications, an encoding wheel 10 of this type rotates in coaxial fashion with the shaft defining a specific decade of the polydecade meter, and interacts with optical or electrical reading means which are capable of examining the said wheel and determining the angular position thereof. More specifically in the present invention, that which is required to be ascertained in which of the 16 sectors 12 proceeding about the wheel overlie a reference line 14 at a given readout time. Typically four concentric tracks of coding may be provided about the said wheel, so that the machine reading means, may by examination of the bits defined in each of the four tracks determine which specific sector is overlying reference line 14, i.e. which sector 12 the sensors are detecting at that given time. The use of such readable indicia tracks to determine angular position of a code wheel, is per se well-known. Reference may be had in this connection, for example, to U.S. Pat. No. 3,262,108. For purposes of simplicity, only a portion 16 of such tracks is shown in the Figure. The number of indicia tracks utilized are such in relationship to the number of sectors, as to enable an unambiguous output indicative of the sector being read. The coding utilized on the indicia tracks is preferably a reflected Gray code, since this insures that when a borderline situation exists the number read out of the encoders will be in error by at most 1 bit. It should also be recognized in this connection that borderline situations of this type only occur within the resolution of the encoder, i.e. each encoding wheel is positioned with a certain angular accuracy, and 1 bit errors only occur when the code wheel has a border over the light source (assuming that a sensor-light source pair construction is in fact utilized to readout the bits, as is shown in the aforementioned Ser. No. 314,391 application). The numbers 18 seen to identify each sector 12 are of course at different angular positions than the numbers 20 representing the decimal division of wheel 10.

In order to understand the nature of the ambiguity and error correction achieved by the invention, we may consider that the encoding wheels heretofor referred to are, in general, divided into sectors of number S, and the encoding wheels are coupled to a gear train with a reduction ratio of $n$. It is assumed that all code wheels and gear ratios between code wheels are the same. The number of sectors determine the number of bits of coding for a binary system, i.e. the minimum number of bits = I.V. $[\log_2 S]$, where the designation "I.V." refers to the integer value of the bracketed expression. Thus it is evident pursuant to this terminology, that where 16 sectors are present, 4 bits are appropriate for encoding; where 10 sectors are present, 4 bits are appropriate; where eight sectors are utilized, 3 bits are appropriate, etc.

Ambiguity correction insures that the corrected number is accurate to the accuracy of the least significant digit (LSD) wheel, with a resolution of one sector of the least significant wheel, the least significant wheel being the "fastest" wheel. The ambiguity correction, therefore, uses the position of the least significant wheel as the "reference" for all corrections. The general procedure is to "accept" the position of the least significant wheel, and use it to correct the next most significant wheel. Once the second most significant wheel is corrected, it in turn is used as a reference for correcting the third most significant wheel. This iterative process is repeated until all wheels have been corrected. The procedure thus is such, that the ambiguity correction can be considered for purposes of analysis, to occur between only two wheels, i.e. a fine wheel (fastest) used as a reference, and a "coarse" wheel, i.e. the wheel to be corrected.

Continuing this analysis, on an assumed basis of a single fine and coarse wheel, it may be assumed that the encoder apparatus is initially pre-aligned such that there is a zero on all encoding wheels when the encoder reads zero, i.e. the border between the highest sector and the lowest value sector is in transition on all wheels. As the encoder rotates the number $N_F$ of sectors on the fine wheel passing the zero reference, cause a certain number $N_C$ of sectors to pass the zero reference on the coarse. Since the code wheels are identical, it follows that $N_C = N_F/n$. It should be noted here that the number of sectors $N_F$ are not limited to the number of sectors on the wheel, i.e. if $n = 10$, $S = 16$, and $N_C = 12$; therefore, $N_F = 120$ sectors, although the code wheel can in this illustration only identify 16 different sectors. It should further be noted that when the fine wheel is on a sector border, that the coarse wheel is not necessarily on a border; e.g. if $n = 10$, $s = 16$ and $N_F = 16$; then $N_C = 1.6$.

The ambiguity correction begins by "examining" the coarse wheel and using its "observed" value to establish the range of $N_F$. If $N_{Fmin_c}$ is defined as the minimum value that the fine wheel can have as calculated from the coarse position, then $N_{Fmin_c} = N_F -$ total completed revolutions of the fine wheel (in terms of sectors). The total number of revolutions of the fine wheel is the integer value of the expression $\{(N_{C_m})(n)/S\}$ where $N_{C_m}$ is the measured value of the coarse wheel. Said integer value being enclosed in braces represents the preceding whole number since that for example a value of 2.3 would have an integer value of 2. Therefore, $$N_{Fmin_c} = n\, N_{C_m} - \text{I.V.} \left\{ \frac{(N_{C_m})(n)}{S} \right\} S$$

and the maximum value the fine wheel can read is $$N_{Fmax_c} = n\, (N_{C_m}+1) - \text{I.V.} \left\{ \frac{[(N_{C_m})+1]n}{S} \right\} S$$

When the coarse wheel is read, it can only be resolved into integer values of S, although the actual reading can be in between. The range that the measured reading $N_{F_m}$ can have, i.e. the quantity $N_{F_m}$ should be in, if $N_{C_m}$ is correct, is as shown in the following inequality:

$$N_{Fmin_c} \leq N_{F_m} < N_{Fmax_c}$$

or, by substitution:

$$n\, N_{C_m} - \text{I.V.} \left\{ \frac{(N_{C_m})(n)}{S} \right\} S \leq N_{F_m} \leq n(N_{C_m}+1) - \text{I.V.} \left\{ \frac{(N_{C_m}+1)n}{S} \right\} S$$

This specifies the minimum and maximum values (Modulo "S"), that $N_{F_m}$ can have, if $N_{C_m}$ is correct. If $N_{F_m}$ does not fall in this range, $N_{C_m}$ is incorrect.

If $N_{F_m} < N_{Fmin_c}$, 1 should be subtracted from $N_{C_m}$, such that the correct coarse value $N_C$ is: $N_C = N_{C_m} - 1$.

Similarly, if $N_{F_m} \geq N_{Fmax_c}$, 1 should be added to $N_{C_m}$ such that the corrected coarse value becomes; $N_C = N_{C_m} + 1$. Thus the coarse wheel is corrected. The next step to use the corrected coarse wheel as a reference for the next most significant wheel, performing the corrections in an identical fashion. It should be noted that all additions and subtractions are Modulo S.

It should be noted that all additions and subtractions are Modulo S, i.e., if $S = 16$ and $n_1$ and $n_2$ are two numbers each less than 16, $n_1 + n_2 =$ actual sum, if $n_1 + n_2 \leq 15$
$n_1 + n_2 = (n_1 + n_2) - 16$, if $n_1 + n_2 > 15$
$n_1 - n_2 =$ actual difference, if $n_1 > n_2$
$n_1 - n_2 = 16 - (n_1 - n_2)$, if $n_2 < n_1$ Example:
$3 + 9 = 12$
$9 + 9 = 2$
$9 - 3 = 6$
$3 - 9 = 10$
$8 + 8 = 0$ To specify the range where errors can occur and be corrected, whether from ambiguities or alignment errors, it should be noted for ambiguity correction a necessary condition is that $$\frac{S}{n} > 1.$$

This can be seen by considering a decade mechanical counter, continuously geared with 10:1 ratio, such as a watt-hour register. If the number of sectors/wheels is 10, borderline ambiguities cannot be resolved, because they occur simultaneously on the low order decades.

The number of sectors of fine that is covered by one sector of coarse is:

$(n)$, sectors of fine therefore, $(s-n)$ sectors are available for ambiguity correction in the fine wheel, or the allowable misalignment of the coarse is; $s-n/n = \xi\, c_s$ error in sectors of coarse. This error in degrees becomes;

$$\left(\frac{360}{S}\right)\left(\frac{s-n}{n}\right) > \xi C_{deg}.$$

or, $$\frac{360}{n} - \frac{360}{s} = 360\, \frac{(s-n)}{ns}$$

Ex., for $n = 10$, $s = 16$ $\xi C_{deg.} = \left(\frac{6}{160}\right)(360) = 13.5°$ or, $\pm 6.75°$ of coarse for $n = 10$, $s = 20$ $C_{deg.} = 360 \left(\frac{10}{200}\right) = 18°$, or $\pm 9°$ Once all the wheels have been corrected, the process of converting the individual wheel readings into the equivalent total number of sectors at the fine wheel can be accomplished. Once the total number of sectors of fine is known, the number can be converted by any scale factor desired. It should be appreciated that the total number of fine sectors is not the sum of all different wheel values scaled by $n$, as the case for decade counters with 10 sectors. This is due to the fact that the sectors for the various wheels do not pass the boundaries synchronously and a fine wheel may have passed to a new sector without the coarse wheel changing sectors. This in fact is generally the case.

The number of accumulated fine sectors in the $(r-1)$ wheel that were not accumulated on the $r^{th}$ wheel are:

$$n^{r-1}\left[N_{r-1}-\left(nN_r-nN_r-\text{I.V.}\left\{\frac{nN_r}{S}\right\}(S)\right)\right]=C_{r-1}$$

Similarly, the next wheel contributes;

$$n^{r-2}\left[N_{r-2}-\left(nN_{r-1}-\text{I.V.}\left\{\frac{nN_{r-1}}{S}\right\}(S)\right)\right]=C_{r-2}$$

until the last wheel;

$$n^{r-(r)}\left[N_{r-r}-\left(nN_{r-(r+1)}-\text{I.V.}\left\{\frac{nN_{(r-(r+1))}}{S}\right\}(S)\right)\right]$$

$$=N_o-\left[nN_1-\text{I.V.}\left\{\frac{nN}{S}\right\}(S)\right]=C_o$$

The total amount of fine sectors being;

$$S_T=\sum_{i=0}^{r}C_i$$

This value can be scaled by any desired factor. After scaling, the conversion is complete.

It may be noted in the foregoing connection, that where 16 sectors are present, and $n=10$, the resolution of the meter is one decimal digit in the units decade, where the resolution of the code wheel is $(1/16)(10)$ of a decimal digit. Since the data is scaled to decimal, the actual angular error cannot exceed one sector, although a decimal number will result. Therefore, the maximum error is: $10/16 = 0.63$ Assuming that 16 sectors are actually present in the encoding wheels of the invention, we may summarize the four main steps required in providing a decimal readout as follows:

1. conversion from each of the cyclic Gray Code numbers in each decade to a decimal number ranging from 0 to 15;
2. ambiguity correction of the three higher decades, i.e. tens, hundreds and thousands;
3. evaluation of the total number of accumulated "fine sectors", $S_T$
4. scaling the above sectors to decimal values.

In effecting (1) as above set forth, a look-up table is effectively required to convert the incoming Gray binary data to mod 16 decimal. A representative table of this type is set forth as Table I hereinbelow:

| D | C | B | A | Sector Value |
|---|---|---|---|---|
| 0 | 0 | 0 | 0 | 0 |
| 0 | 0 | 0 | 1 | 1 |
| 0 | 0 | 1 | 1 | 2 |
| 0 | 0 | 1 | 0 | 3 |
| 0 | 1 | 1 | 0 | 4 |
| 0 | 1 | 1 | 1 | 5 |
| 0 | 1 | 0 | 1 | 6 |
| 0 | 1 | 0 | 0 | 7 |
| 1 | 1 | 0 | 0 | 8 |
| 1 | 1 | 0 | 1 | 9 |
| 1 | 1 | 1 | 1 | 10 |
| 1 | 1 | 1 | 0 | 11 |
| 1 | 0 | 1 | 0 | 12 |
| 1 | 0 | 1 | 1 | 13 |
| 1 | 0 | 0 | 1 | 14 |
| 1 | 0 | 0 | 0 | 15 |

Where D is the MSB.

These numbers will represent the measured numbers from each decade:

$N_{u_m}$ = Number of sectors in units measured.
$N_{T_m}$ = Number of sectors in tens measured.
$N_{H_m}$ = Number of sectors in hundreds measured.
$N_{th_m}$ = Number of sectors in thousands measured.

It is these four numbers that will be processed.

2. Ambiguity & Error Correction
   A. Tens Decade
      1. Calculate possible range of $N_{u_c}$ from $N_{T_m}$ $$10N_{t_m}-\text{I.V.}\left\{\frac{N_{t_m}10}{16}\right\}16\leq N_{u_m}<10(N_{t_m}+1)-\text{I.V.}\left\{\frac{(N_{t_m}+1)10}{16}\right\}16$$

2. If $N_{u_m}$ falls in this range, accept $N_{t_m}$ as $N_t$ (correct value)
3. If $N_{u_m}$ is less than the lower bound, subtract 1 from $N_{t_m}$ i.e., $$N_t=N_{t_m}-1=\text{corrected value}$$

4. If $N_{u_m}$ is equal to or greater than the upper bound, add 1 to $N_{t_m}$ $$N_t={}_{Nt}+1=\text{corrected value}$$

B. Hundreds Decade
   1. Calculate possible range of $N_{t_c}$ from $N_{H_m}$ $$10N_{H_m}-\text{I.V.}\left\{\frac{N_{H_m}10}{16}\right\}16\leq N_t<10(N_{H_m}+1)-\text{I.V.}\left\{\frac{N_{H_m}+1)10}{16}\right\}16$$

2. If $N_t$ falls in this range, accept $N_{H_m}$
$$N_{H_m}=N_H$$

3. If $N_t$ falls below the lower bound, subtract 1 from $N_{H_m}$ i.e., $$N_H=N_{H_m}-1=\text{corrected value}$$

4. If $N_t$ is equal to or greater than the upper bound, add $+1$ to $N_{H_m}$ $$N_H=N_{H_m}+1=\text{corrected value}$$

C. Thousands Decade
   1. Calculate possible range of $N_{H_c}$ from $H_{th_m}$ $$10N_{th_m}-\text{I.V.}\left\{\frac{N_{H_m}10}{16}\right\}16\leq N_{H_s}<10(N_{H_m}+1)-\text{I.V.}\left\{\frac{(N_{H_m}+1)10}{16}\right\}16$$

2. If $N_H$ falls in the range, accept $N_{th_m}$ $$N_{th} = N_{th_m}$$

3. If $N_H$ falls below the lower bound, subtract one from $N_{th_m}$ $$N_{th} = N_{th_m} - 1 = \text{corrected value}$$

4. If $N_H$ is equal to or greater than the upper bound, add one to $N_{th_m}$ $$N_{th} = N_{th_m} + 1 = \text{corrected value}$$

This completes the ambiguity and error correction.

3. Evaluation of total number of fine sectors a. Thousands decade $$C_{th} = 1000 \ (N_{th})$$

b. Hundreds decade $$C_H = 100 \left[ N_H - \left( 10 N_{th} - \text{I.V.} \left\{ \frac{10 N_{th}}{16} \right\} 16 \right) \right]$$

c. Tens decade $$C_T = 10 \left[ N_T - \left( 10 N_H - \text{I.V.} \left\{ \frac{10 N_H}{16} \right\} 16 \right) \right]$$

d. Units Decade $$C_u = \left[ N_u - \left( 10 N_T - \text{I.V.} \left\{ \frac{10 N_T}{16} \right\} 16 \right) \right]$$

e. Sum of all fine sectors $$S_T = C_u + C_T + C_H + C_{th}$$

4. Scaling to Decimal $$\text{Decimal value} = \frac{10}{16} S_T$$

This completes the entire conversion.

This section gives some numerical examples of possible conversions:

EXAMPLE 1

Assume the number to be converted is: 6299.000 portion to be encoded Gray Binary Word

| | | |
|---|---|---|
| Units in Sectors | = 14.40 = | 1 0 0 1 |
| Tens in Sectors | = 15.84 = | 1 0 0 0 |
| Hundreds in Sectors | = 4.784 = | 0 1 1 0 |
| Thousands in Sectors | = 10.0784 = | 1 1 1 1 |

The above assumes no alignment errors, but since an alignment error of up to + 0.3 sectors can occur in all but the least significant decade, which is assumed 0 error, a possible set of numbers could be:

| | | | Gray Binary Word |
|---|---|---|---|
| Units in Sectors | = 14.2 | = | 1 0 0 1 |
| Tens in Sectors | = 16.01 | = | 0 0 0 0 |
| Hundreds in Sectors | = 5.03 | = | 0 1 1 1 |
| Thousands in Sectors | = 9.91 | = | 1 1 0 1 |

The data entering the interface is:

| | |
|---|---|
| Units | 1 0 0 1 |
| Tens | 0 0 0 0 |
| Hundreds | 0 1 1 1 |
| Thousands | 1 1 0 1 |

This data gets converted via the look-up to:

$N_{u_m} = 14$ $N_{t_m} = 0$ $N_{H_m} = 5$ $N_{th_m} = 9$

Ambiguity Correction Tens Decade $$10(0) - \text{I.V.} \left\{ \frac{0(10)}{16} \right\} 16 \leq N_{u_m} < 10(1) - \text{I.V.} \left\{ \frac{10(1)}{16} \right\} 16$$

$$0 \leq N_{u_m} < 10 - 0$$

Therefore, the range is (in Modulo 16)

| 13, 14, 15 | 0, 1, 2.....8, 9 | 10, 11, 12 |
|---|---|---|
| −1 | accept | +1 |

Since, $N_{u_m}$ falls below the range, 1 must be subtracted from $N_{t_m}$ $$N_t = 15$$

Ambiguity correction for Hundreds Decade $$10(5) - \text{I.V.} \left\{ \frac{5(10)}{16} \right\} 16 \leq N_t < 10(6) - \text{I.V.} \left\{ \frac{10(6)}{16} \right\} 16$$

$$50 - 3(16) \leq N_t < 60 - 3 \ (16)$$

$$2 \leq N_t < 12$$

Therefore, the range is:

| 15, 0, 1 | 2, 3,......10, 11 | 12, 13, 14 |
|---|---|---|
| −1 | accept | +1 |

Since $N_t = 15$ $N_H = 5 - 1 = 4$

Ambiguity correction for Thousands Decade $$9(10) - \text{I.V.} \left\{ \frac{9(10)}{16} \right\} 16 \leq N_H < 10(10) - \text{I.V.} \left\{ \frac{10(10)}{16} \right\} 16$$

$90 - 5(16) \leq N_H < 100 - 6(16)$
$10 \leq N_H < 4$

| 7, 8, 9 | 10, 11, 12,....1, 2, 3 | 4, 5, 6 |
|---|---|---|
| −1 | Accept range | +1 |

$N_{th} = 9 + 1 = 10$

This completes the ambiguity and error correction, where $N_u = 14$
$N_t = 15$
$N_H = 4$
$N_{th} = 10$ It is interesting to note that the sector values are those that appeared before the errors were introduced.

Evaluating total number of fine sectors $S_T$

Thousands Decade $$C_{th} = (10)(1000)$$

Hundreds Decade $$C_H = 100 \left[ 4 - \left(10(10) - \text{I.V.} \left\{\frac{10(10)}{16}\right\} 16\right)\right]$$
$= 400 - [100 - 6(16) \quad 100]$
$= 400 - 400 = 0 \;!!$
$C_H = 0$ no contribution !!

Tens Decade $$C_T = 10 \left[15 - \left(10(4) - \text{I.V.} \left\{\frac{10(4)}{16}\right\}16\right)\right]$$
$= 10(15 - (40 - 32))$
$= 10(15 - 8) = 70$
$C_T = 70$ Units Decade $$C_u = 14 - \left[10(15) - \text{I.V.} \left\{\frac{10(15)}{16}\right\} 16\right]$$
$= 14 - [150 - 144] = 14 - 6 = 18$
$C_u = 8$ $S_T$
$S_T = \epsilon C; = 10000 + 0 + 70 + 8$
$S_T = 10078$ Scaling
$S_T (10/16) =$ Decimal Number
Decimal number $= 10078 (10/16) = 6298.75$
which is correct to within ± 1 sector of the least significant decade.

EXAMPLE 2

Convert the number 9999.9

|  |  | Actual Sectors | Assumed Error in Sectors | Measured Sectors | Gray Binary Word |
|---|---|---|---|---|---|
| Units in Sectors | = | 15.84 | +.16 | 0 | 0 0 0 0 |
| Tens in Sectors | = | 15.984 | 0 | 15 | 1 0 0 0 |
| Hundreds in Sectors | = | 15.9984 | +.1 | 0 | 0 0 0 0 |
| Thousands in Sectors | = | 15.99984 | 0 | 15 | 1 0 0 0 |

Entering the interface are the four gray binary words

| Units | 0 0 0 0 |
|---|---|
| Tens | 1 0 0 0 |
| Hundreds | 0 0 0 0 |
| Thousands | 1 0 0 0 | which gets converted via the look-up table to:

| Units | 0 |
|---|---|
| Tens | 15 |
| Hundreds | 0 |
| Thousands | 15 |

Figure 2:
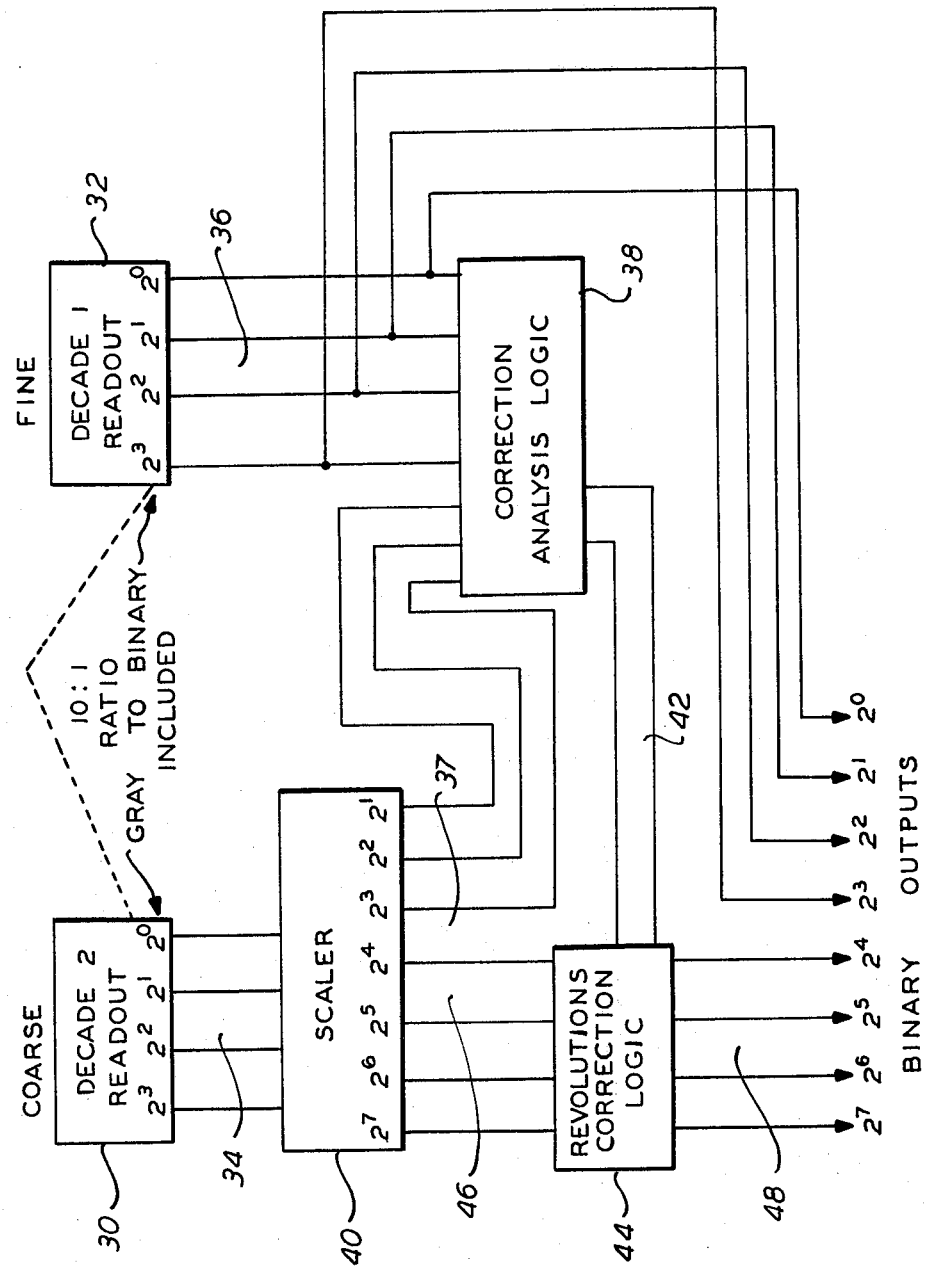
FIG. 2 is a schematic block diagram, showing the manner in which the principles of the invention may be employed in a decimally geared system, utilizing a minimum number of binary bits to correct for ambiguities.

In FIG. 2 a system in accordance with the invention is shown, based upon a 4 bit binary code (i.e. 4 bits per encoding wheel), where successive wheels are geared on a 10:1 ratio. Readout means 30 and 32 are respectively associated with a course and a fine encoding wheel — as have been discussed in the foregoing analysis. This is to say that means 30 and 32 are typically associated with successive decades in a polydecade meter. Four parallel outputs are provided from each of means 30 and 32, as respectively shown at reference numerals 34 and 36. It is assumed for purposes of this analysis that the outputs 34 and 36 from each of the means 30 and 32 are already converted from Gray to ordinary binary form. The outputs 36 from the fine encoding wheel are provided to correction analysis logic 38 and also are part of outputs 48. The outputs 34 from means 30 are initially re-weighted at scaling means 40 so as to be binarily related to the outputs from means 32. This may be effected by simple multiplication by the binary factor 101. The outputs 37 from scaling means 40 are in turn provided to correction analysis logic 38, which utilizing conventional logic elements perform the ambiguity analysis set forth above. An output is provided in lines 42 from correction analysis logic 38 to revolutions correction logic 44, which directs the addition or subtraction of one, or the acceptance of the number of revolutions indicated by the four output lines 46 from scaling means 40. The corrected readings in binary are now present at all of the output lines 48, which may then be provided to scaling means, to conventional binary to BCD conversion means, etc., so as to yield a decimal readout.

While the present invention has been particularly set forth in terms of specific embodiments thereof, it will be understood that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. Encoding apparatus for providing unambiguous data outputs from polydecade meters of the type including a plurlity of successive decades, each decade including a rotatable shaft for a dial indicator associated therewith, successive shaft rotations being related by a fixed gear ratio n therebetween, comprising in combination:

a plurality of encoding wheels, at least one said wheel being coaxially mounted for rotation with the rotatable shaft associated with each decade of said polydecade meter;

each said encoding wheel being divided into a plurality of sectors extending about said wheel;

machine readable indicia on said wheel for determining which of said sectors is at an angular reference position;

means for reading said indicia at the wheels associated with a respectively higher and lower order decade, to provide measured determinations of the rotational positions of said wheels in terms of said sectors;

means for establishing the possible rotational range of said lower order decade wheel from said measured value of said higher order wheel;

means for comparing the measured rotational position of said lower order wheel with said determined range to generate an adjusting signal; and means for adjusting upwardly, downwardly or leaving unchanged the measured value of said higher decade wheel, in accordance with said determination of whether said lower decade wheel falls within said range.

2. Apparatus in accordance with claim 1, wherein at least said wheel associated with said lower order decade is divided into $s$ of said sectors, and wherein the ratio $s/n$ is greater than 1.

3. Encoder apparatus in accordance with claim 2, wherein said sectors are initially read out in a cyclic reflected Gray code.

4. Apparatus in accordance with claim 3, wherein said read-out cyclic Gray code is converted to a decimal number corresponding to the sectors prior to establishing said range and evaluating the relationship of adjacent decades to said determined range.

5. Apparatus in accordance with claim 4, further including means for determining the total number of accumulated sectors which have passed said reference position at said lower order decade wheel, and for scaling the accumulated secors to provide a decimal output for said encoding apparatus.

6. Apparatus in accordance with claim 5, wherein said wheels are provided with concentric indicia tracks about the face thereof, of sufficient number in relationship to the number of sectors to provide an unambiguous bit output indicative of the sectors being read.

7. Apparatus in accordance with claim 6, wherein said encoding wheels are divided into sixteen said sectors, said decades being four in number.

* * * * *